Nov. 18, 1930.  E. HASSMAN  1,782,067
CORN GATHERER
Filed June 12, 1928  2 Sheets-Sheet 1
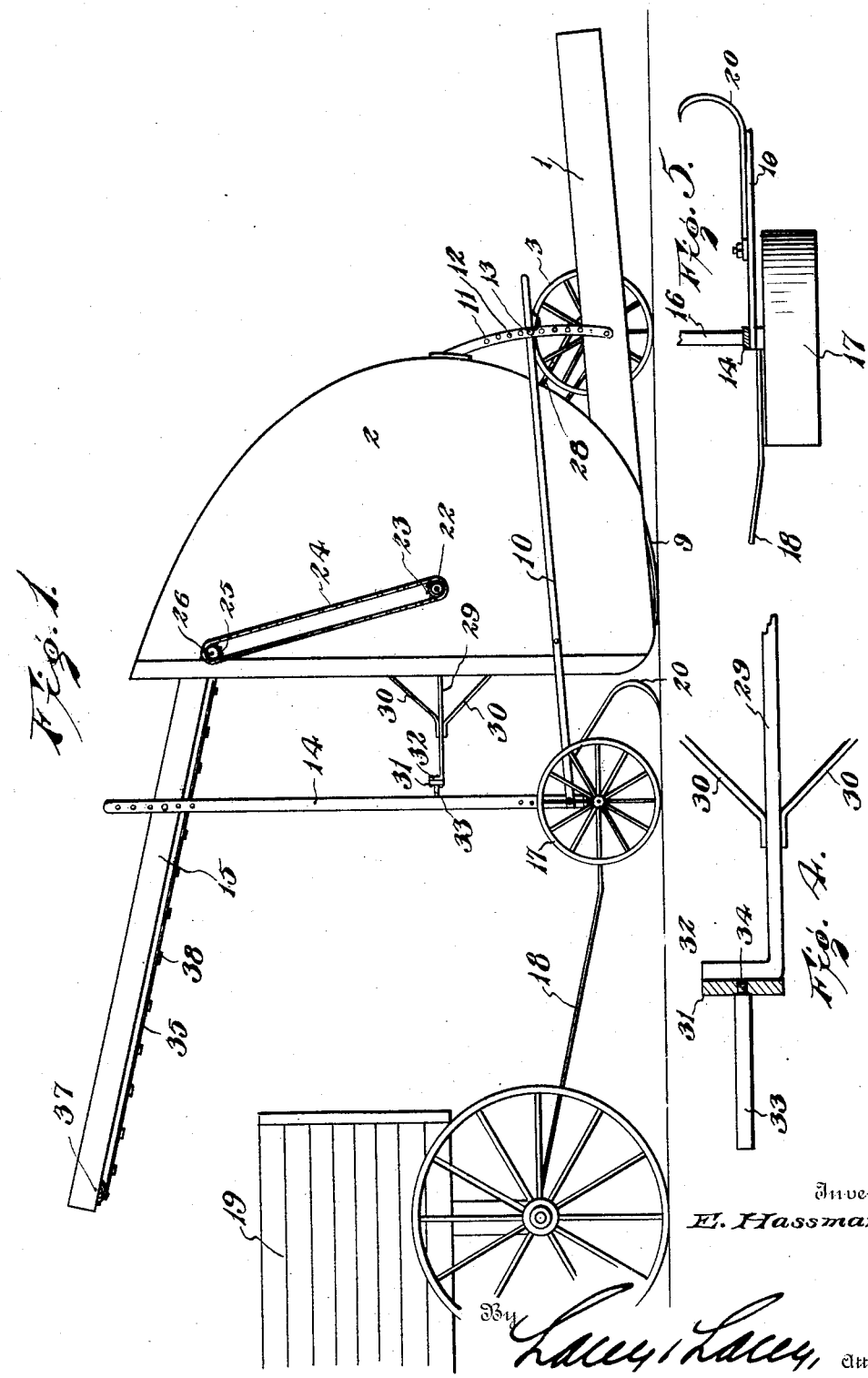
Inventor
E. Hassman
By Lacey & Lacey, Attorneys Nov. 18, 1930.   E. HASSMAN   1,782,067
CORN GATHERER
Filed June 12, 1928   2 Sheets-Sheet 2
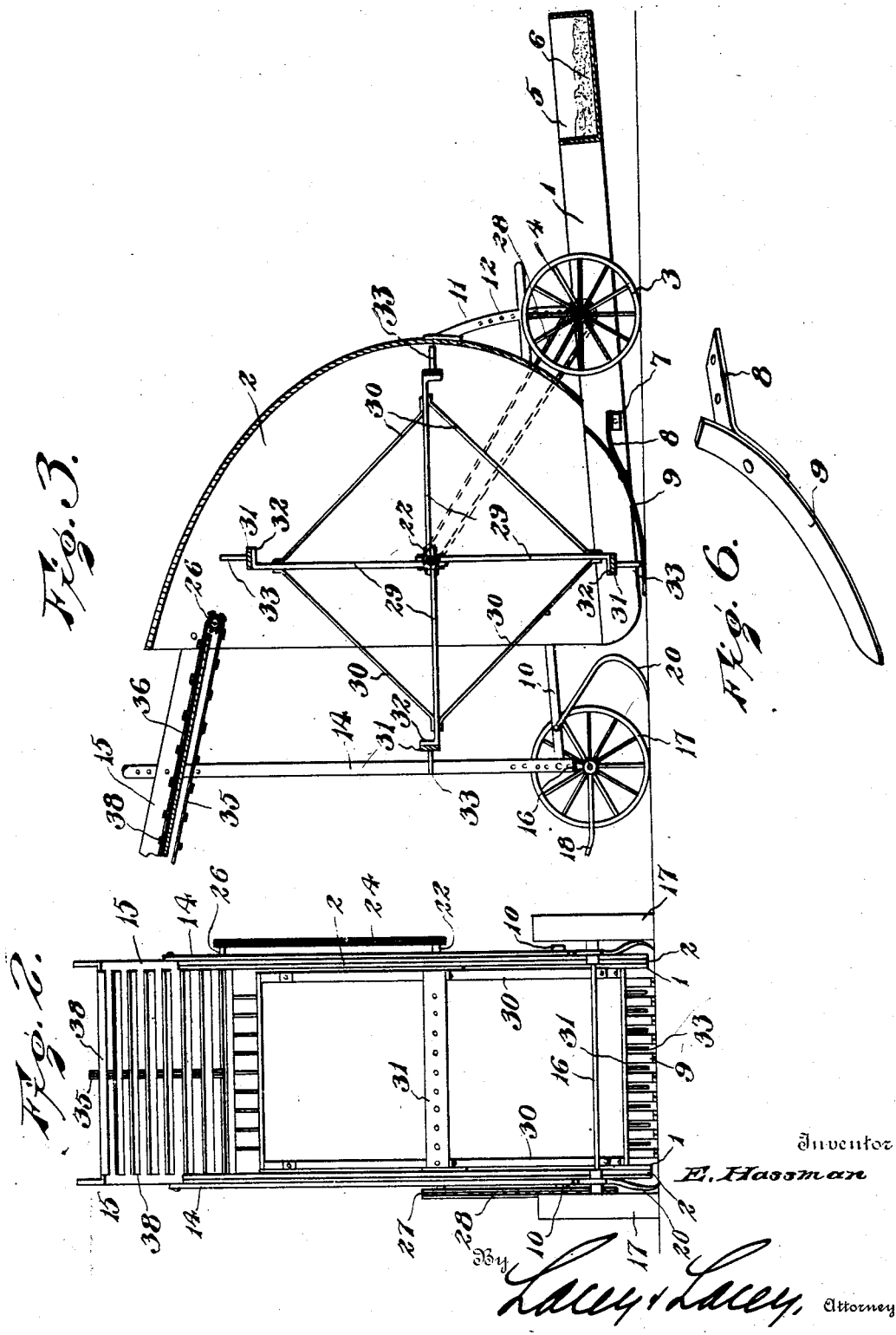
Inventor
E. Hassman
By Lacey & Lacey, Attorneys Patented Nov. 18, 1930

1,782,067

UNITED STATES PATENT OFFICE

EDWARD HASSMAN, OF FLEMING, COLORADO

CORN GATHERER

Application filed June 12, 1928. Serial No. 284,735.

This invention has for its object the provision of an inexpensive apparatus which may be coupled to a wagon or other portable receptacle to travel behind the same and pick up fallen corn or other crops and transfer the same to the receptacle for removal to a silo or other point of use. The invention provides means whereby fallen crops will be picked up and lifted entirely clear of the ground and then delivered into the vehicle in a continuous operation, the apparatus being driven through the power generated by tractive engagement of its supporting wheels with the surface of the ground. The invention also provides means whereby the crops during their transfer to the wagon will be held against lateral movement which would tend to permit them to drop back to the ground and also includes means whereby the crop-engaging elements may be adjusted so as to obtain the proper engagement with the crops. The invention is illustrated in the accompanying drawings and will be hereinafter fully set forth and particularly defined.
In the drawings:

Figure 1 is a side elevation of an apparatus embodying the invention;

Fig. 2 is a front elevation of the same;

Fig. 3 is a longitudinal vertical section;
Fig. 4 is an enlarged detail section of a portion of the transfer wheel;

Fig. 5 is an enlarged detail sectional view showing the means for bringing the fallen and spread crops into the line of the pick-up apparatus, and Fig. 6 is a detail perspective view showing one of the pick-up fingers.

In carrying out the invention, there is provided a frame consisting of sills or side bars 1, at the front ends of which is secured a housing 2 having an open front and having a back and top which may conveniently be formed in one piece of plate material and which is arcuate throughout its greater vertical extent, as clearly shown in Fig. 3. At the rear of the housing 2, ground wheels 3 are carried by an axle 4 which is preferably extended through the sills 1 so as to be supported thereby, and at the extreme rear end of said sills is secured a box 5 in which a counter-weighting material, such as sand indicated at 6, may be placed so as to counterbalance the housing and the parts mounted therein and prevent the frame tipping forwardly to dig into the ground. As shown most clearly in Fig. 3, the bottom of the housing 2 as well as the front thereof is open and at the lower edge of the rear wall of the housing a cross bar 7 is pivoted to and extends between the sills, brackets 8 being secured to the upper side of said cross bar to form a series extending entirely across the machine, and to the front end of each bracket is secured a take-up finger 9 which curves downwardly and forwardly from the bracket so that its front end will run upon the ground and engage under the crop to partially lift the same, as the apparatus is drawn forwardly, and direct it into the housing. Pivotally mounted upon each side of the housing adjacent the front thereof is an adjustable lever or sustaining bar 10 which extends rearwardly beyond the housing and may be adjustably attached to an arcuate bar 11 secured at its upper end to the housing and at its lower end to the respectively adjacent sill so as to serve as a brace for the structure and also as a means for securing the lever or sustaining bar 10 in a set position. To thus secure the sustaining bar, a plurality of openings 12 are formed through the bracket or brace 11 and a pin 13 is inserted through a selected opening 12 and through an opening in the sustaining bar so that the bar will be held in a set position in an obvious manner. The front ends of the bars 10 are pivotally attached to standards 14 which are disposed in front of the housing and extend upwardly to be attached to the frame of a conveyer 15 and thereby support the conveyer. To the lower ends of the standards 14, I secure a cross bar 16 which serves as a front axle upon the ends of which are mounted ground wheels 17, as shown. Draft couplings 18 are also attached to the axle 16 and extend forwardly therefrom to be connected in any convenient manner to the rear axle of a wagon, indicated at 19. At the rear of the front axle 16, gathering hooks 20 are pivoted to the bars 10 and extend downwardly and rearwardly therefrom at the inner sides of the wheels 17 with their ends or tips projecting forwardly to ride under and lift the fallen stalks and turn the same inwardly into the line of travel between the wheels 17 and dispose them in position to be engaged by the pick-up fingers 9.

Extending through the housing and journaled in the sides thereof concentric with the arcuate rear wall of the same is a shaft 22 having the transfer wheel secured thereon between the sides of the housing. Upon one end of the shaft 22 is secured a sprocket 23, and a chain 24 is trained about said sprocket and about an upper sprocket 25 secured on the end of a shaft 26 which extends through the housing adjacent the upper forward corner of the same and constitutes the driving shaft for the conveyer. A sprocket 27 is secured upon the shaft 22 at the opposite side of the housing and a chain 28 is trained about said sprocket and a sprocket secured on the rear axle 4 so that the rotation of the rear axle will be transmitted to the shaft 22 and thence to the shaft 26 to operate the transfer wheel and the conveyer in unison. The transfer wheel comprises a plurality of pairs of radial arms or spokes 29 reinforced by braces 30, and plates 31 secured to and extending between the free ends of the members of each pair of spokes, the ends of the spokes being turned laterally, as at 32, for the attachment of said plate. In each plate 31, I secure a series of transfer fingers 33 which, as the wheel is rotated, will travel close to the pick-up fingers 9, preferably in the spaces between adjacent fingers, so that they will engage behind the portions of the crop which may be resting on said fingers and will sweep the same up through the housing and throw it onto the conveyer. The transfer fingers may conveniently be light rods having threaded tenons 34 which are screwed into the cross plates or bars 31, as clearly shown in Fig. 4. The arrangement of the plates and transfer fingers is such that the plates are presented edgewise to the strain imposed thereon and the fingers are firmly secured.

The conveyer comprises one or more longitudinal chains 35 traveling above and below a bottom plate 36 of the conveyer frame and engaged with sprockets upon the shaft 26 and upon a similar shaft, indicated at 37, mounted in the conveyer frame at the forward end of the same, and it will be noted upon reference to Fig. 1 that the forward end of the conveyer is disposed over the vehicle so that the material carried forwardly by the conveyer will be deposited in the vehicle. Carried by the conveyer chains are transverse bars 38 which will engage the material deposited upon the conveyer by the transfer wheel and will scrape the same over the bottom of the conveyer frame to the forward end thereof at which point it will drop into the vehicle.

From the foregoing description, taken in connection with the accompanying drawings, it will be seen that I have provided an exceedingly simple and inexpensive apparatus by the use of which fallen crops may be easily picked up and delivered into a vehicle for such subsequent disposition as may be most advantageous. The width of the transfer wheel is such that it fits closely between the sides of the conveyer and the radius thereof is such that the transfer fingers will travel close to the rear wall of the housing, the result being that the crops are held within the housing to be positively and effectually engaged and supported by the transfer fingers until delivered onto the conveyer, and the gearing is so timed that the material will be given sufficient momentum to be thrown forward onto the conveyer as the successive sets of transfer fingers reach the highest point of their travel adjacent the rear end of the conveyer.

Having thus described the invention, I claim:

1. An apparatus for the purpose set forth comprising a frame, a traveling support for the frame connected thereto between the ends thereof, a housing carried by the frame in advance of said support, transfer mechanism mounted in the housing, and a counter-balance carried by the rear end of the frame.

2. An apparatus for the purpose set forth comprising a frame, a ground wheel mounted in said frame between the ends thereof, a housing carried by the frame in advance of said wheel, transfer mechanism mounted in the housing, a box secured to the rear end of the frame, and counter-balancing means in said box.

3. An apparatus for the purpose set forth comprising a frame, a ground wheel mounted in the frame between the ends thereof, a housing carried by the frame in advance of said wheel, a counter-balance on the rear end of the frame, means for coupling the forward portion of the frame to a vehicle, and a transfer wheel mounted concentrically in the housing and actuated from the ground wheel.

4. An apparatus for the purpose set forth comprising a frame, a wheel supporting the frame, a housing mounted on the front end of the frame, ground wheels disposed at the front of the housing, sustaining means mounted on the sides of the housing and connected with said wheels, means at the rear of the housing for locking said sustaining means and vertically adjusting the housing, transfer mechanism mounted in the housing and actuated by the wheel supporting the frame, and means connected with the front ground wheels for connecting the housing and the frame with a vehicle.

5. An apparatus for the purpose set forth comprising a frame, a ground wheel supporting the frame between the ends thereof, a housing mounted on the front end of the frame in advance of said ground wheel, standards disposed in front of and spaced from the housing, ground wheels carried by the lower ends of the standards, levers fulcrumed between their ends on the sides of the housing and connected at their front ends with the standards, a conveyor supported by said standards and extending forwardly from the housing, the rear end of the conveyer being mounted within the housing at the top of the same, and transfer mechanism mounted within the housing, said mechanism and the conveyer being actuated by the wheel supporting the frame.

6. An apparatus for the purpose set forth comprising a frame, wheels supporting the frame, a housing carried by the front end of the frame, the front and bottom of the housing being open, pick-up fingers secured on the frame adjacent the lower edge of the back of the housing and projecting forwardly, and a transfer wheel mounted in the housing above the frame and arranged to sweep past the pick-up fingers to carry through the housing material resting on the fingers.

7. An apparatus for the purpose set forth comprising a wheel-supported frame, a housing carried by the front end of the frame, the front and bottom of the housing being open, pick-up fingers secured on the frame at the bottom of the rear wall of the housing and projecting forwardly to pass under fallen crops and raise the same, a transfer mechanism mounted within the housing and arranged to travel over said pick-up fingers, and gathering fingers mounted in advance of the housing and arranged to ride over the surface of the ground and having their rear ends turned inwardly whereby to engage crops and turn the same into the path of the pick-up fingers.

8. An apparatus for the purpose set forth comprising a wheel-supported frame, forwardly projecting pick-up fingers secured on the frame, a housing mounted on the frame with its back wall terminating at said fingers, the front and bottom of the housing being open, and a transfer wheel journaled in the housing and provided with transverse sets of transfer fingers arranged to travel over said pick-up fingers.

9. An apparatus for the purpose set forth comprising a wheel-supported frame, a housing carried by the front end of the frame and having an open front and bottom, and a transfer wheel rotatably mounted in the housing above the frame and actuated by the frame-supporting wheel, said transfer wheel comprising a plurality of spokes, cross plates connecting the free ends of the spokes in pairs, and transfer fingers carried by said plates.

10. An apparatus for the purpose set forth comprising a traveling frame, a housing mounted on the front end of the frame and having an open front and bottom and a closed back and top, a transfer wheel mounted within the frame concentric with the back of the same, and a conveyer having its rear end supported by and within the housing at the upper forward corner thereof, the conveyer extending forwardly from the housing and being disposed to receive material thrown forwardly by the transfer wheel.

In testimony whereof I affix my signature.
EDWARD HASSMAN. [L. S.]